(12) United States Patent
Li (10) Patent No.: US 12,393,282 B2
(45) Date of Patent: Aug. 19, 2025

(54) METHOD AND DEVICE FOR DISPLAY APPARATUS COMPRISING A PLURALITY OF MODES INCLUDING A SAFE MODE

(71) Applicant: BOE TECHNOLOGY GROUP CO., LTD., Beijing (CN)

(72) Inventor: Haifeng Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/687,363

(22) PCT Filed: Aug. 22, 2022

(86) PCT No.: PCT/CN2022/113853
§ 371 (c)(1),
(2) Date: Feb. 28, 2024

(87) PCT Pub. No.: WO2024/040371
PCT Pub. Date: Feb. 29, 2024

(65) Prior Publication Data
US 2024/0427428 A1    Dec. 26, 2024

(51) Int. Cl.
*G06F 3/02* (2006.01)
(52) U.S. Cl.
CPC ...................................... *G06F 3/02* (2013.01)
(58) Field of Classification Search
CPC ........................................................ G06F 3/02
See application file for complete search history.

(56) References Cited

U.S. PATENT DOCUMENTS

| | | | |
|---|---|---|---|
| 12,130,926 B2 * | 10/2024 | Liu | G06F 21/575 |
| 2009/0143044 A1 * | 6/2009 | Thorson | H04B 15/02 |
| | | | 455/404.1 |
| 2018/0074927 A1 * | 3/2018 | Mori | G06F 11/27 |
| 2023/0297683 A1 * | 9/2023 | Liu | G06F 21/575 |
| | | | 713/2 |

FOREIGN PATENT DOCUMENTS

| | | |
|---|---|---|
| CN | 102566818 A | 7/2012 |
| CN | 102880397 A | 1/2013 |
| CN | 105611046 B | 11/2016 |
| CN | 107908962 A | 4/2018 |

* cited by examiner

*Primary Examiner* — Gene W Lee
(74) *Attorney, Agent, or Firm* — HOUTTEMAN LAW LLC (57) ABSTRACT

The present disclosure provides a control method for a display apparatus, which is applied to a control device, the control method including: judging, by the control device, whether an input operation of an input device belongs to a preset operation in response to the input operation of the input device, and determining a current operating mode of the display apparatus; and controlling the display apparatus to execute corresponding functions according to the preset operation and the operating mode in response to the input operation belonging to the preset operation. The preset operation includes a combination of a plurality of key operations, and the operating mode is one of a plurality of optional modes including the safe mode. The present disclosure further provides a control device for a display apparatus, a display apparatus and a computer readable medium.

16 Claims, 7 Drawing Sheets

METHOD AND DEVICE FOR DISPLAY APPARATUS COMPRISING A PLURALITY OF MODES INCLUDING A SAFE MODE

FIELD OF THE DISCLOSURE

The present disclosure relates to the field of display technology, in particular to a control method for a display apparatus and a control device for a display apparatus, a display apparatus and a readable medium.

BACKGROUND OF THE DISCLOSURE

With the continuous development of intelligent terminal technology, intelligent terminal devices (such as electronic devices as smart phones, tablet computers, game machines, and digital multimedia players) play an increasingly important role in people's life and entertainment. Generally, an intelligent terminal device may support a variety of input devices, such as an infrared remote control, a Bluetooth remote control, physical keys on the device, and the like. Anyone may operate and control the intelligent terminal device through these input devices, so that the intelligent terminal device is exposed to a relatively insecure environment.

SUMMARY OF THE DISCLOSURE

In order to at least solve one of the technical problems in the prior art, the present disclosure provides a control method for a display apparatus and a control device for a display apparatus, a display apparatus and a computer readable medium.

To achieve the above objects, the present disclosure provides a control method for a display apparatus, which is applied to a control device, the control method including: judging, by the control device, whether an input operation of an input device belongs to a preset operation in response to the input operation of the input device, and determining a current operating mode of the display apparatus; and controlling the display apparatus to execute corresponding functions according to the preset operation and the operating mode in response to the input operation belonging to the preset operation; wherein the preset operation includes a combination of a plurality of key operations, and the operating mode is one of a plurality of optional modes including the safe mode.

In some embodiments, the control method further includes: judging whether the input device is a preset forbidden device or not when the input operation of the input device does not belong to the preset operation and the operating mode is the safe mode; and controlling the display apparatus to filter out the input operation in response to the input device being the preset forbidden device.

In some embodiments, the preset operation is determined according to preconfigured key information, and the key information includes: at least one of a function of a key, a number of times a key has been pressed and a sequence of keys.

In some embodiments, the control device includes a main controller; the preset operation includes a mode switching operation; and the mode switching operation includes: combining key operations sequentially performed on a plurality of first type keys according to a first sequence within a preset time period; and when the input operation is the mode switching operation and the operating mode is a non-safe mode, the controlling the display apparatus to execute the corresponding functions includes: controlling, by the main controller, the display apparatus to open the safe mode, and generating and storing a safe mode identifier.

In some embodiments, when the input operation is the mode switching operation and the operating mode is the safe mode, the controlling the display apparatus to execute the corresponding functions includes: controlling the display apparatus to close the safe mode, and clearing the safe mode identifier stored in the control device.

In some embodiments, when the input operation is the mode switching operation and the operating mode is the non-safe mode, controlling the display apparatus to execute the corresponding functions further includes: outputting, by the control device, a configuration request to request a user to input configuration information; wherein the configuration information includes: device information of a preset forbidden device and key information corresponding to the mode switching operation; and receiving and storing, by the control device, the configuration information input by the user.

In some embodiments, the outputting, by the control device, the configuration request includes: judging, by the control device, whether first valid flag information is stored in the control device; and in response to the first valid flag information being not stored in the control device, outputting the configuration request to request the user to input the configuration information; and outputting a flag request to request the user to input one of the first valid flag information and the second valid flag information; with the first valid flag information for indicating that the configuration information input by the user is valid continuously; and the second valid flag information indicating that the configuration information input by the user is valid in the current safe mode; and the method further includes: receiving and storing, by the control device, the first valid flag information or the second valid flag information input by the user.

In some embodiments, the determining the current operating mode of the display apparatus includes: judging, by the control device, whether a safe mode identifier is stored in the control device; and determining that the current operating mode of the display apparatus is the safe mode in response to the safe mode identifier being stored in the control device.

In some embodiments, the preset operation includes: a safe turn-off operation, and the safe turn-off operation includes: combining key operations sequentially performed on a second type key and a plurality of first type keys according to a second sequence within a preset time period during the operation process of the display apparatus; the control device includes a main controller and an auxiliary controller; and wherein the input operation is the safe turn-off operation and the operating mode is the safe mode, controlling the display apparatus to execute the corresponding functions includes: controlling, by the main controller, the display apparatus to be turned off and writing the safe mode identifier stored in the main controller into the auxiliary controller.

In some embodiments, when the display apparatus is in a turn-off state, judging, by the control device, whether or not the safe mode identifier is stored in the control device includes: judging, by the auxiliary controller, whether the safe mode identifier is stored in the auxiliary controller; the preset operation further includes a safe turn-on operation; the safe turn-on operation includes: combining key operations sequentially performed on a second type key and the plurality of first type keys according to a second sequence within a preset time period when the display apparatus is in the turn-off state; and when the input operation is the safe turn-on operation and the operating mode is the safe mode, controlling the display apparatus to execute the corresponding functions includes: controlling the display apparatus to be turned on.

In some embodiments, the second type key includes a power key.

In some embodiments, the auxiliary controller includes a single chip microcomputer.

An embodiment of the present disclosure further provides a control device for a display apparatus, including: a judging module configured to judge whether an input operation of an input device belongs to a preset operation in response to the input operation of the input device, and determine a current operating mode of the display apparatus; and a processing module configured to control the display apparatus to execute corresponding functions according to the preset operation and the operating mode in response to the input operation belonging to the preset operation; wherein the preset operation includes a combination of a plurality of key operations, and the operating mode is one of a plurality of optional modes including the safe mode.

An embodiment of the present disclosure further provides a display apparatus, including: one or more processors; a memory for storing one or more programs therein; the one or more programs, when executed by the one or more processors, cause the one or more processors to implement the above method.

An embodiment of the present disclosure further provides a computer readable medium, on which a computer program is stored, wherein the computer program, when executed by a processor, implements the above method.

BRIEF DESCRIPTION OF THE DRAWINGS

The accompanying drawings, which are provided for further understanding of the present disclosure and constitute a part of this specification, are for explaining the present disclosure together with the embodiments of the present disclosure, but are not intended to limit the present disclosure. In the drawings:

FIG. 5-1 is a schematic diagram of a control method provided in further embodiments of the present disclosure.

FIG. 5-2 is a schematic diagram of a control method provided in further embodiments of the present disclosure.

DETAILED DESCRIPTION OF THE EXEMPLARY EMBODIMENTS

In order to make one of ordinary skill in the art better understand technical solutions of the present disclosure, a control method for a display apparatus and a control device for a display apparatus, a display apparatus and a computer readable medium provided by the present disclosure will be described in detail below with reference to the accompanying drawings.

Exemplary embodiments will be described more fully hereinafter with reference to the accompanying drawings. However, the exemplary embodiments may be embodied in different forms, and the present disclosure should not be construed as limited to the embodiments set forth herein. Rather, the exemplary embodiments are provided such that this disclosure will be thorough and complete, and will fully convey the scope of the present disclosure to one of ordinary skill in the art.

The terms used herein are for the purpose of describing particular embodiments only and are not intended to limit of the present disclosure. As used herein, the singular forms "a", "an" and "the" are intended to include the plural forms as well, unless the context clearly indicates otherwise. It will be further understood that the terms "comprise" and/or "include", when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used for distinguishing one element from another. Thus, a first element, a first component, or a first assembly discussed below could be termed a second element, a second component, or a second assembly in a case of not departing from the teachings of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Generally, an intelligent terminal device may support a variety of input devices, such as an infrared remote control, a Bluetooth remote control, physical keys on the device, and the like. Anyone may operate and control the intelligent terminal device through these input devices under certain conditions, so that the intelligent terminal device is exposed to a relatively insecure environment. For example, in some scenes (e.g., in some scenes for publicity and exhibition), a user sets the intelligent terminal device to display a picture or play a program, and then, the user wants the intelligent terminal device to display the content all the time. However, if other people successfully pair a Bluetooth device or other input devices with the intelligent terminal device in a pairing manner, the intelligent terminal device will be operated by other people or directly operated through physical keys, so that the risk that the displayed content is changed by other people occurs.

Figure 1:
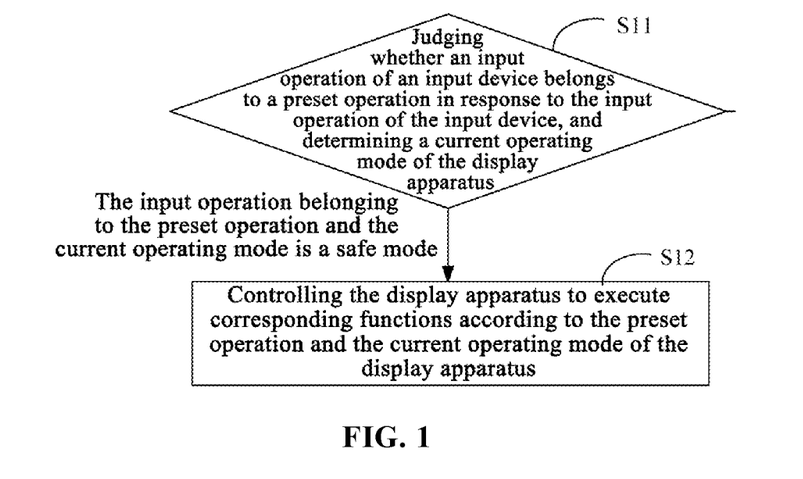
FIG. 1 is a flowchart of a control method for a display apparatus provided in some embodiments of the present disclosure.

The embodiment of the present disclosure provides a control method for a display apparatus, and the display apparatus may be an intelligent terminal device supporting various input devices, such as a computer and a television. FIG. 1 is a flowchart of a control method for a display apparatus provided in some embodiments of the present disclosure, which may be performed by a control device in the display apparatus. As shown in FIG. 1, the control method includes the following steps S11 to S12 performed in the process of the operation of the display apparatus:

In the step S11, the control device determines (judges) whether an input operation of an input device belongs to a preset operation in response to the input operation of the input device, and determines a current operating mode of the display apparatus.

In some embodiments, the input device is a device capable of inputting instructions to the display apparatus, and may be, for example, a Bluetooth remote control, an infrared remote control, keys on the device, a keyboard, or the like. The operating mode is one of a plurality of optional modes, and the display apparatus may operate in any optional mode, wherein the plurality of optional modes may include a safe mode and a non-safe mode. The preset operation is a specific operation supported in the safe mode. For example, the preset operation may include a combination of a plurality of key operations. It should be noted that in the step S11, first, it may be possible to determine whether the input operation is the preset operation, and then to determine the current operating mode of the display apparatus. Alternatively, first, it may be possible to determine the current operating mode of the display apparatus and then to determine whether the input operation is the preset operation, which is not limited in the present disclosure.

In the step S12, the display apparatus is controlled to execute corresponding functions according to the preset operation and the current operating mode of the display apparatus in response to the input operation belonging to the preset operation.

In the step S12, when the display apparatus is in the safe mode, if the input operation is the preset operation, the control device controls the display apparatus to execute the corresponding functions according to the preset operation. For example, the display apparatus may be controlled to enter the safe mode, close the safe mode, be turned on, or be turned off according to the preset operation.

In the embodiment of the present disclosure, in the case that the input operation of the input device is the preset operation, the control device may control the display apparatus to execute the corresponding functions according to the preset operation and the current operating mode of the display apparatus; and the preset operation includes a combination of a plurality of key operations, thereby improving the safety of the control of the display apparatus.

In some embodiments, the control method for a display apparatus further includes: when the input operation of the input device does not belong to the preset operation (that is, the input operation of the input device does not meet the specific requirement of the safe mode) and the current operating mode of the display apparatus is the safe mode, judging whether the input device is a preset forbidden device, and if so, controlling the display apparatus to filter out the input operation for this time. That is, the display apparatus makes no response to current input operation, so that the display apparatus is prevented from being operated by others in its operation process to influence its safety. If the input device is not the preset forbidden device, the display apparatus is controlled to execute the corresponding action according to the input operation. For example, when the input operation is pressing a volume up key, the playback volume of the display apparatus is increased.

The input operation of the input device may be sent to the control device through a wireless signal or a wired signal, the signal carries key information of the input operation and the device information of the input device. The control device may judge whether the input device is the preset forbidden device according to the device information carried in the signal.

In some embodiments, the preset operation may be determined according to preconfigured key information, for example, including: one or more of functions of the keys, the number of times a key has been pressed, and a sequence of the keys.

In some embodiments, the preset operations include: mode switching operation and safe turn-on operation. The mode switching operation and the safe turn-on operation are determined according to the preset key information, and correspond to the different key information respectively. The mode switching operation may control the switching of the operating modes, for example, to control the display apparatus to open the safe mode (i.e., enter the safe mode from the non-safe mode) or turn off the safe mode (i.e., enter the non-safe mode from the safe mode).

For example, the mode switching operation may specifically include a combination of key operations sequentially performed on the plurality of first type keys according to a first sequence within a preset time period. Correspondingly, the key information corresponding to the mode switching operation includes: the functions of the first type keys, the number of times of pressing each first type key, and the first sequence. The safe turn-on operation may specifically include: a combination of key operations sequentially performed on a second type key and the plurality of first type keys according to a second sequence within a preset time period when the display apparatus is in a turn-off state. Correspondingly, the key information corresponding to the safe turn-on operation includes: the functions of the first type keys and the second type key, the number of times of pressing each of the first type key and the second type key, and the second sequence.

For example, the preset time may be 0.5 s or 1 s or 1.5 s or 2 s. The first type keys may be keys for controlling a playing interface and sound, such as a "menu" key for entering a menu, a "back" key for returning to a previous program or a previous interface, a "volume up" key for controlling an increase in volume, or an "up" key, a "down" key, a "left" key, or a "right" key for turning pages in the menu in various directions, or the like. The second type key may be a power key.

Figure 2:
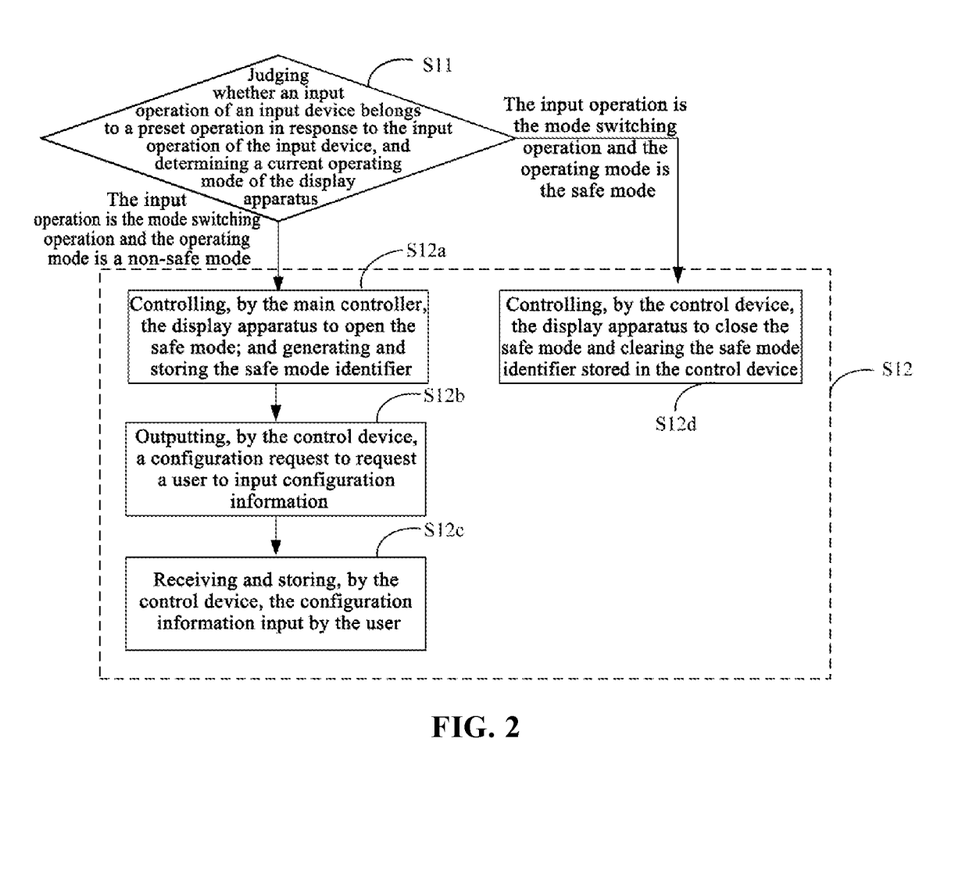
FIG. 2 is a schematic diagram of a control method provided in further embodiments of the present disclosure.

FIG. 2 is a schematic diagram of a control method provided in further embodiments of the present disclosure. The control method is performed by the control device, including a main controller and an auxiliary controller. The main controller may include a system mainboard, and the auxiliary controller may include a single chip microcomputer, such as a 51 single chip microcomputer. When the display apparatus is not turned off, the system mainboard and the auxiliary controller may operate; when the display apparatus is turned off, the system mainboard does not operate, and the auxiliary controller may respond to the input operation.

As shown in FIG. 2, the control method includes the following steps S11 to S12.

In the step S11, the control device judges whether the input operation belongs to the preset operation in response to the input operation of the input device, and determines the current operating mode of the display apparatus.

The specific process of determining the current operating mode of the display apparatus may include: judging, by the control device, whether a safe mode identifier is stored in the control device, and if so, determining that the current operating mode of the display apparatus is the safe mode; if not, determining that the current operating mode of the display apparatus is the non-safe mode.

In the step S12, the display apparatus is controlled to execute corresponding functions according to the preset operation and the current operating mode of the display apparatus in response to the input operation being the preset operation.

When it is determined in the step S11 that the input operation is the mode switching operation and the operating mode is the non-safe mode, the step S12 specifically includes step S12a.

In the step S12a, the main controller controls the display apparatus to open the safe mode; and the safe mode identifier is generated and stored. The safe mode identifier indicates that the current operating mode is the safe mode.

When it is determined in the step S11 that the input operation is the mode switching operation and the operating mode is the safe mode, step S12 specifically includes step S12d.

In the step S12d, the control device controls the display apparatus to close the safe mode and clears the safe mode identifier stored in the control device.

In some embodiments, when it is determined in the step S11 that the input operation is the mode switching operation and the operating mode is the non-safe mode, the step S12 may further include steps S12b and S12c.

In the step S12b, the control device outputs a configuration request to request a user to input configuration information. The configuration information includes: device information of the preset forbidden device and the key information corresponding to the mode switching operation. The device information may be information such as a device name or a device type or the like.

In the step S12c, the control device receives and stores the configuration information input by the user.

It should be noted that the present disclosure does not limit the sequence of the steps S12a and S12b, and the step S12a may be performed, and then the step S12b may be performed; or the step S12b may be performed, and then the step S12a may be performed; the steps S12a and S12b may also be performed simultaneously.

In some embodiments, it is possible to output configuration requests every time safe mode is enabled. Alternatively, it is possible to output a configuration request when a certain safe mode is enabled, and no longer output a configuration request after each safe mode after the certain safe mode.

Figure 3:
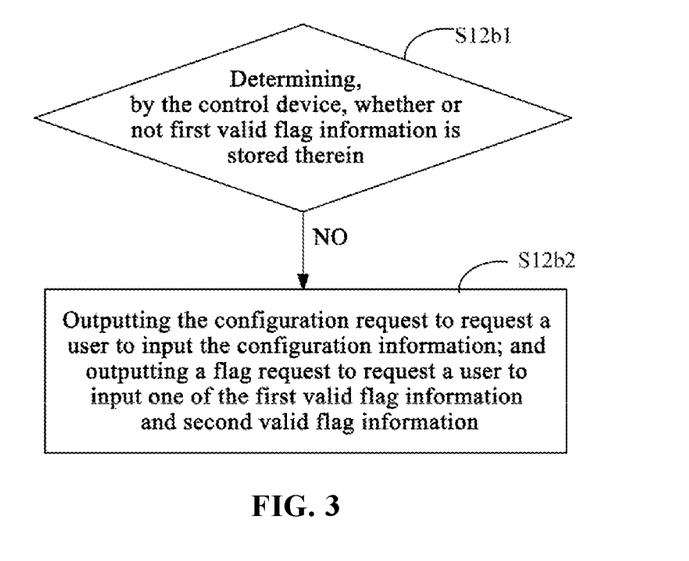
FIG. 3 is a flowchart of an alternative implementation of step S12b provided in some embodiments of the present disclosure.

FIG. 3 is a flowchart of an alternative implementation of step S12b provided in some embodiments of the present disclosure. As shown in FIG. 3, the step S12b includes steps S12b1 to S12b2.

In the step S12b1, the control device determines whether or not first valid flag information is stored therein. If not, step S12b2 is performed: outputting the configuration request to request a user to input the configuration information; and outputting a flag request to request a user to input one of the first valid flag information and second valid flag information. If the first valid flag information is stored, the configuration request and the flag request are not output any more.

When the user inputs the configuration information, the control device receives and stores the configuration information. When the user inputs the first valid flag information or the second valid flag information, the control device also receives and stores the first valid flag information and the second valid flag information input by the user.

The first valid flag information indicates that the configuration information input by the user is valid continuously; the second valid flag information indicates that the configuration information input by the user is valid in the current safe mode.

That is, if the user inputs the first valid flag information and the configuration information when the safe mode is opened, the configuration request may not be output any more when the safe mode is opened each time later. If the user inputs the second valid flag information and the configuration information when the safe mode is opened, the configuration request still needs to be output when the safe mode is opened again later.

Figure 4:
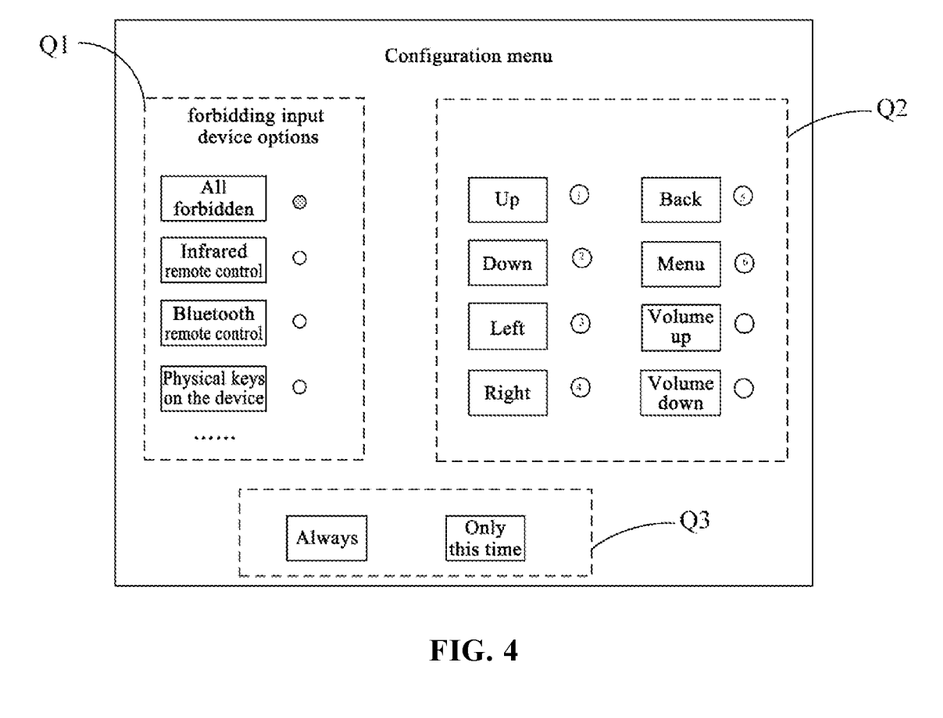
FIG. 4 is a schematic diagram of a configuration menu provided in some embodiments of the present disclosure.

In some embodiments, the configuration request and the flag request may be output simultaneously. For example, FIG. 4 is a schematic diagram of a configuration menu provided in some embodiments of the present disclosure. A dashed line box Q1 in the configuration menu displays "forbidding input device options", a dashed line box Q2 displays "options of key combination for opening or closing safe mode", and a dashed line box Q3 displays "Always" and "Only this time" options. "Forbidding input device options", and the "options of key combination for opening or closing safe mode" are used as configuration requests. "Always" and the "Only this time" are used as the flag requests. If the user selects the "Always" option, equivalently, the first valid flag information is input. If the user selects the "Only this time" option, equivalently, the second valid flag information is input.

In one example, the input device may include: an infrared remote control, a Bluetooth remote control, and physical keys on the device. When the user selects "all forbidden", any input device is used as the preset forbidden device. In one example, as described above, the mode switching operation may be: a combination of key operations sequentially performed on the plurality of first type keys according to the first sequence within the preset time period. For example, if the user sequentially selects "up", "down", "left", or "right", "back" and "menu" keys in the sequence indicated in the dashed line box Q2, the first sequence is the sequence in which the user selects the keys shown in the dashed line box Q2, and the mode switching operation is sequentially pressing "up", "down", "left", or "right", "back" and "menu" keys within the preset time period.

In one example, when the user selects "Always" option, equivalently, the first valid flag information is input. In this case, the forbidden input device and the key information of the mode switching operation currently selected by the user may be permanently stored in the control device. The configuration request and the flag request may not be output any more when the safe mode is opened the next time. When the user selects "Only this time" option, equivalently, the second valid flag information is input. In this case, the forbidden input device and the key information of the mode switching operation currently selected by the user are no longer valid after the current safe mode is finished. When the safe mode is opened again, the configuration request and the flag request need to be output again.

In the embodiment of the present disclosure, the input device may be configured by a user. For example, all the input devices may be used as preset forbidden devices; or a part of the input devices may be used as the preset forbidden devices. In addition, the key information of the mode switching operation may be configured by the user, so that various configuration requirements of the user can be flexibly met.

Figure 51:
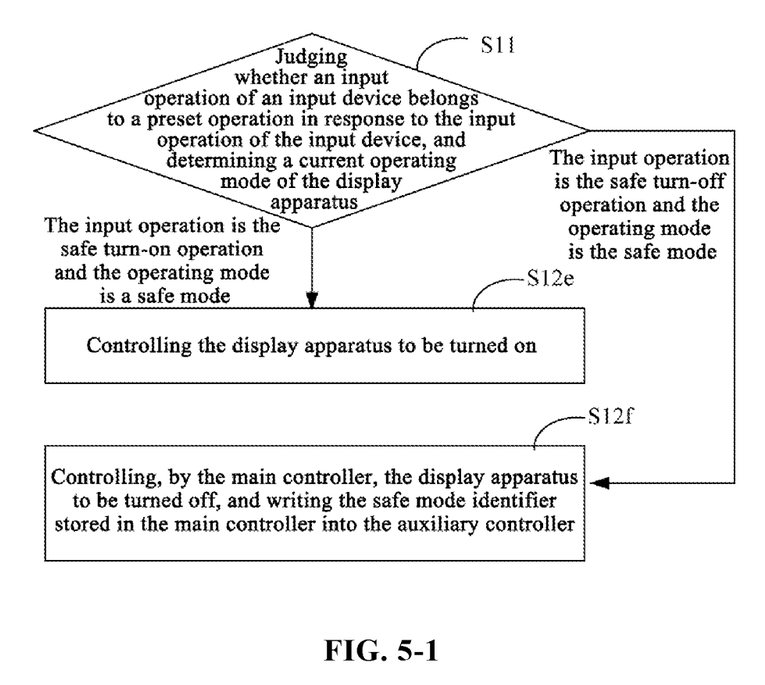

FIG. 5-1 is a schematic diagram of a control method provided in further embodiments of the present disclosure. As shown in FIG. 5-1, the control method includes the following steps S11 to S12.

In the step S11, the control device judges whether the input operation belongs to the preset operation in response to the input operation of the input device, and determines the current operating mode of the display apparatus.

In the step S12, the display apparatus is controlled to execute corresponding functions according to the preset operation and the current operating mode of the display apparatus in response to the input operation being the preset operation.

As described above, the preset operation may include the safe turn-on operation. When it is determined in the step S11 that the input operation is the safe turn-on operation and the operating mode is the safe mode, the step S12 specifically includes step S12e.

In the step S12e: the display apparatus is controlled to be turned on.

When it is determined in the step S11 that the input operation is a safe turn-off operation and the operating mode is the safe mode, the step S12 specifically includes: controlling the display apparatus to be turned off.

As described above, when the input operation is the mode switching operation and the operating mode is the non-safe mode, the main controller generates and stores the safe mode identifier while controlling the display apparatus to open the safe mode. Correspondingly, when the input operation is the safe turn-off operation and the operating mode is the safe mode, the step S12 specifically includes: S12f, controlling, by the main controller, the display apparatus to be turned off, and writes the safe mode identifier stored in the main controller into the auxiliary controller. Therefore, under the condition that the display apparatus is turned off, when the input device inputs the safe turn-on operation, the auxiliary controller may determine that the display apparatus is in the safe mode according to the safe mode identifier stored in the auxiliary controller.

The safe turn-on operation may be a combination of key operations sequentially performed on the second type key and the plurality of first type keys according to the second sequence within preset time period during the operation process of the display apparatus. The safe turn-off operation may be a combination of key operations sequentially performed on the second type key and the plurality of first type keys according to the second sequence within preset time period during the operation process of the display apparatus.

The second type key in the safe turn-on operation and the safe turn-off operation may be the same key, for example, a power key.

In the embodiment of the present disclosure, when the display apparatus is in the safe mode, the input device inputs the safe turn-on operation and the safe turn-off operation (i.e., a combination of specific keys), and the display apparatus may be controlled to be turned on and turned off, so that the safety of the display apparatus is further ensured.

In addition, in some embodiments, the key information of the safe turn-on operation and the safe turn-off operation may be determined according to the key information of the mode switching operation. For example, in the above example, the mode switching operation is to sequentially press "up", "down", "left", "right", "back" and "menu" keys within preset time period. In this case, the safe turn-on operation is to sequentially press "up", "down", "left", "right", "back" and "menu" keys within preset time period in the turn-off state of the display apparatus. The safe turn-off operation is to sequentially press the power key, "up", "down", "left", "right", "back" and "menu" keys within preset time period in the operation state of the display apparatus. Therefore, the key information of the safe turn-on operation and the key information of the safe turn-off operation are also set according to the configuration of the user, so that the requirements of the user can be flexibly met.

The control method in the embodiment of the present disclosure is explained below with reference to an example.

Figure 52:
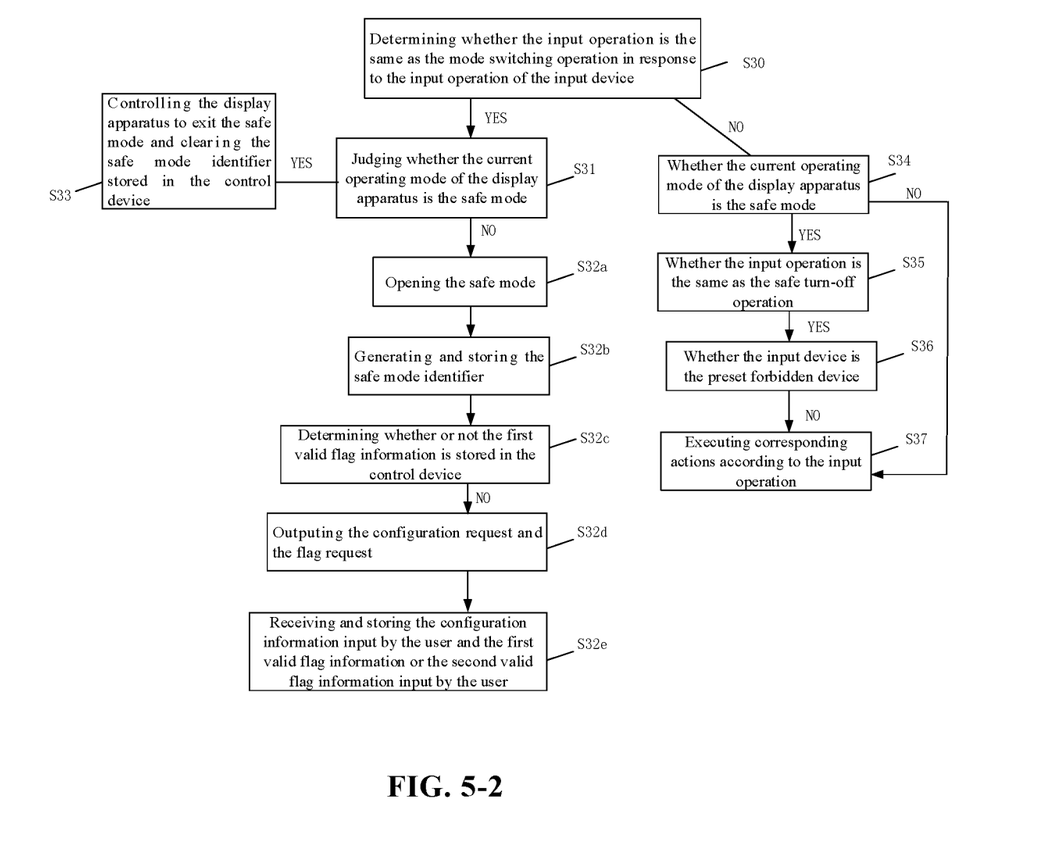

FIG. 5-2 is a schematic diagram of a control method provided in further embodiments of the present disclosure. The steps illustrated in FIG. 5-2 are performed during the operation of the display apparatus. As shown in FIG. 5-2, the control method includes steps S30 to S37.

In the step S30, the control device determines whether the input operation is the same as the mode switching operation in response to the input operation of the input device. If so, step S31 is performed.

In some embodiments, when the display apparatus is operated for the first time (i.e., the first operation), the mode switching operation may be a preset operation; the mode switching operation may be set and adjusted by the user during operation of the display apparatus after the first operation.

In the step S31, the control device judges whether the current operating mode of the display apparatus is the safe mode. If the current operating mode is the non-safe mode, the steps S32a to S32d are performed.

In the step S32a, the safe mode is opened.

In the step S32b, the control device generates and stores the safe mode identifier. The safe mode identifier is identification information for indicating whether the display apparatus is to open or has opened the safe mode. In the step S32b, the safe mode identifier may be stored in the main controller of the control device.

In the step S32c, the control device determines whether or not the first valid flag information is stored in the control device. If not, the step S32d is performed.

In the step S32d, the configuration request is output to request the user to input the configuration information and the valid flag information; and the flag request is output to request the user to input one of the first and second valid flag information. The first valid flag information indicates that the configuration information input by the user is valid continuously; the second valid flag information indicates that the configuration information input by the user is valid in the current safe mode.

In the step S32e, the configuration information input by the user and the first valid flag information or the second valid flag information input by the user are received and stored.

If the current operating mode is determined to be the safe mode in the step S31, the process proceeds to step S33.

In the step S33, the control device controls the display apparatus to exit the safe mode and clears the safe mode identifier stored in the control device.

That is, when the current operating mode of the display apparatus is the safe mode and the input device inputs the mode switching operation, the safe mode is exited. When the current operating mode of the display apparatus is the non-safe mode and the input device inputs the mode switching operation, the safe mode is opened.

In some embodiments, as shown in FIG. 5-2, when it is determined in the step S30 that the input operation is different from the mode switching operation, step S34 is performed.

In the step S34, it is judged whether the current operating mode of the display apparatus is the safe mode. If so, step S35 is performed.

In the step S35, it is judged whether the input operation is the same as the safe turn-off operation. If so, the turn-off process is performed. If not, step S36 is performed.

In the step S36, it is judged whether the input device is the preset forbidden device. If so, the input operation is filtered out; if not, step S37 is performed: executing corresponding actions according to the input operation. For example, when the input operation is pressing a volume up key, the playback volume of the display apparatus is increased.

In some embodiments, as shown in FIG. 5-2, when it is determined in the step S34 that the current operating mode of the display apparatus is the non-safe mode, step S37 is also performed.

In some embodiments, the display apparatus is an Android apparatus. In the step S37, the display apparatus may response to the input operation according to a standard event processing procedure of an Android system.

Figure 6:
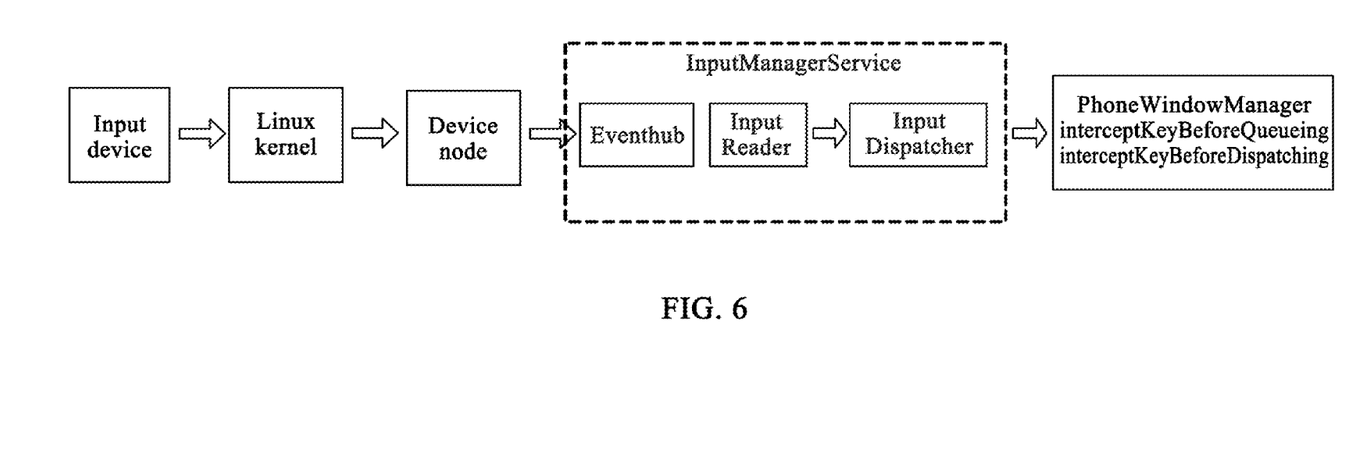
FIG. 6 is a schematic diagram of a power-off procedure provided in some embodiments of the present disclosure.

FIG. 6 is a schematic diagram of a structure for executing a standard event processing procedure in an Android system. As shown in FIG. 6, the Linux kernel maps each input device to a corresponding device node file. When the input device performs the input operation, the Linux kernel receives an interruption of the input device and writes data of the original input operation into a corresponding device node.

An input manager service is an Android system service, and includes two input system key components, that is, an input reader and an input dispatcher.

An Event listener (EventHub) is used for monitoring the addition and removal of the input device and the data change of the input events of the input device, reading data of a device file, and returning the data of the original input events to the input reader.

The input reader runs in an independent thread and is responsible for processing the data of the original input events, so that the events are continuously taken out of the EventHub through getEvents and are processed. The input reader assembles the original input events into the input events containing more information, which are then transmitted to the input dispatcher for dispatching.

The input dispatcher is another key component in the input manager service, and also runs in a separate thread. After receiving the input events from the input reader, the input dispatcher dispatches the events to a phone window manager.

Two methods including interceptKeyBeforeQueueing and interceptKeyBeforeDispatching in the phone window manager process a packaged input event transmitted from a front end and carry out corresponding processing again to realize the user function corresponding to the final input event.

Figure 7:
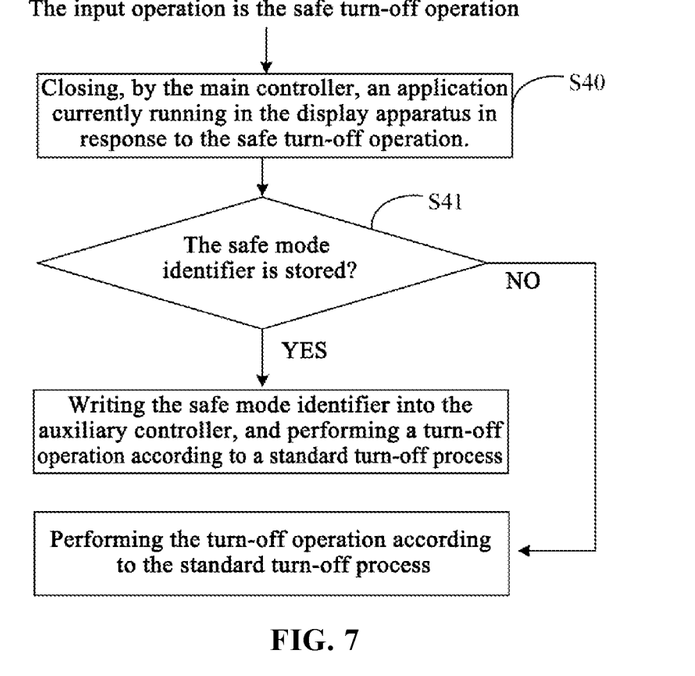
FIG. 7 is a schematic diagram of a power-off procedure provided in one example of the present disclosure.

FIG. 7 is a schematic diagram of a turn-off procedure provided in one example of the present disclosure. As shown in FIG. 7, the turn-off procedure includes steps S40 to S41.

In the step S40, when the input operation of the input device is the safe turn-off operation, the main controller of the control device closes an application currently running in the display apparatus in response to the safe turn-off operation.

In the step S41, the main controller detects whether the safe mode identifier is stored in the main controller. If so, the main controller writes the safe mode identifier into the auxiliary controller, and performs a turn-off operation according to a standard turn-off process, such as a standard turn-off process of an Android system. If not, the main controller performs the turn-off operation according to the standard turn-off process. The auxiliary controller may include a single chip microcomputer, and when the display apparatus is in the turn-off state, the single chip microcomputer may still receive external signals. By writing the safe mode identifier into the auxiliary controller, the auxiliary controller may judge that the operating mode of the display apparatus is the safe mode when the display apparatus is in the turn-off state, and further may control the display apparatus to be turned on in the safe mode in response to the safe turn-on operation of the input device.

Figure 8:
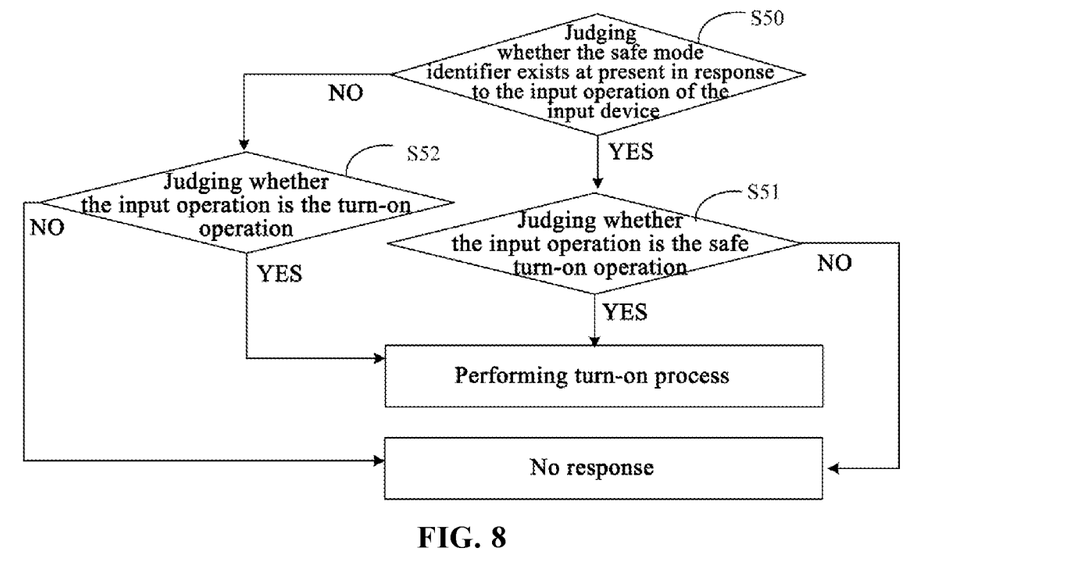
FIG. 8 is a schematic diagram of steps of a control method performed when a display apparatus is in a power-off state provided in an example of the present disclosure.

FIG. 8 is a schematic diagram of steps of a control method performed when a display apparatus is in a turn-off state provided in an example of the present disclosure. As shown in FIG. 8, in some embodiments, the control method further includes the following steps S50 to S52 performed when the display apparatus is in the turn-off state.

In the step S50, the auxiliary controller judges whether the safe mode identifier exists in the auxiliary controller at present in response to the input operation of the input device. If so, step S51 is performed; otherwise, step S52 is performed.

In the step S51, it is judged whether the input operation is the safe turn-on operation. If so, a turn-on process is performed; otherwise, no response is given.

In some embodiments, the safe turn-on operation may include sequentially combining a plurality of key operations in an order. In one example, the safe turn-on operation may specifically be: pressing the power key+a plurality of key operations in the mode switching operation.

In the step S52, it is judged whether the input operation is the turn-on operation. If so, the turn-on process is performed.

In the step S52, when the power key on any one of the input devices adapted to the display apparatus is pressed, the turn-on operation may be performed.

Figure 9:
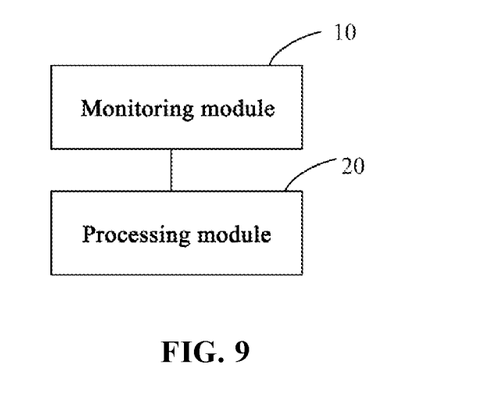
FIG. 9 is a schematic diagram of a control device provided in some embodiments of the present disclosure.

The embodiment of the present disclosure further provides a control device for a display apparatus, which is used for performing the control method. FIG. 9 is a schematic diagram of a control device provided in some embodiments of the present disclosure. The control device includes: a monitoring module 10 and a processing module 20.

The monitoring module 10 is configured to judge whether the input operation belongs to the preset operation, in response to the input operation of the input device; and determine the current operating mode of the display apparatus.

The processing module 20 is configured to control the display apparatus to execute corresponding functions according to the preset operation and the operating mode in a case that the input operation is the preset operation.

The preset operation includes a combination of a plurality of key operations, and the operating mode is one of a plurality of optional modes including the safe mode.

In some embodiments, the preset operation is determined according to preconfigured key information, where the key information includes: at least one of the function of the key, the number of time that the key is pressed, and the sequence of keys.

In some embodiments, the processing module 20 is further configured to determine whether the input device is the preset forbidden device when the input operation of the input device does not belong to the preset operation and the operating mode is the safe mode; and if so, control the display apparatus to filter out the input operation.

In some embodiments, the processing module 20 includes the main controller and the auxiliary controller; the preset operation includes the mode switching operation; the mode switching operation includes: sequentially combining key operations of the plurality of first type keys according to the first sequence within a preset time period.

Under the condition that the input operation is the mode switching operation and the operating mode is the non-safe mode, the main controller controls the display apparatus to open the safe mode; and generate and store the safe mode identifier.

In some embodiments, when the input operation is the mode switching operation and the operating mode is the safe mode, the main controller controls the display apparatus to close the safe mode and clears the safe mode identifier stored in the control device.

Under the condition that the input operation is the mode switching operation and the operating mode is the non-safe mode, the main controller outputs the configuration request to request the user to input the configuration information; the configuration information includes: the device information of the preset forbidden device and the key information corresponding to the mode switching operation. Then, the main controller receives and stores the configuration information input by the user.

In some embodiments, the main controller determines whether the first valid flag information is stored in the main controller. If not, the main controller outputs the configuration request to request the user to input the configuration information; and outputs the flag request to request the user to input one of the first and second valid flag information. The first valid flag information indicates that the configuration information input by the user is valid continuously; and the second valid flag information indicates that the configuration information input by the user is valid in the current safe mode. Then, the main controller receives and stores the first valid flag information or the second valid flag information input by the user.

In some embodiments, when the input operation is the safe turn-off operation and the operating mode is the safe mode, the main controller controls the display apparatus to be turned off, and writes the safe mode identifier stored in the main controller into the auxiliary controller.

Figure 10:
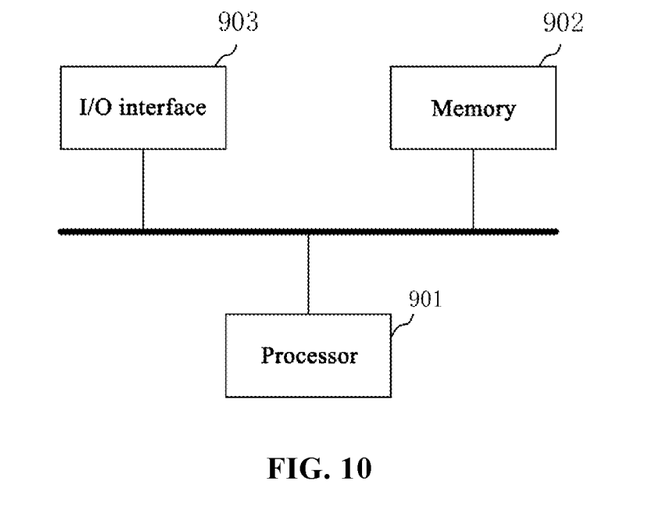
FIG. 10 is a schematic diagram of a display apparatus provided in some embodiments of the present disclosure.

FIG. 10 is a schematic diagram of a display apparatus provided in some embodiments of the present disclosure. As shown in FIG. 10, the display apparatus includes:

One or more processors 901;

A memory 902, having one or more programs stored thereon, when being executed by the one or more processors, the one or more programs cause the one or more processors to implement the control method for the display apparatus according to any one of the above embodiments; and One or more I/O interfaces 903 connected between the one or more processors and the memory, and configured to realize information interaction between the one or more processors and the memory.

Each processor 901 is a device with data processing capability, and includes, but is not limited to, a Central Processing Unit (CPU), etc. The memory 902 is a device with data storage capability, and includes, but is not limited to, a Random Access Memory (RAM, more specifically SDRAM, DDR, etc.), a Read Only Memory (ROM), an Electrically Erasable Programmable Read Only Memory (EEPROM), and/or a FLASH memory (FLASH). Each I/O interface (e.g., read/write interface) 903 is connected between the processor 901 and the memory 902, realizes information interaction between the processor 901 and the memory 902, and includes, but is not limited to, a data bus and/or the like.

In some embodiments, the processor 901, the memory 902, and the I/O interface 903 are interconnected via a bus, thereby being connected to other components of a computing device.

The present embodiment further provides a computer readable medium, on which a computer program is stored, where when the program is executed by a processor, the control method in the foregoing embodiments is implemented. In order to avoid repeated descriptions, specific steps of the method are not described herein again.

It will be understood by one of ordinary skill in the art that all or some of the steps of the methods, and functional components/units of a system and a device as disclosed above may be implemented as software, firmware, hardware, and suitable combinations thereof. In a hardware implementation, the division between functional components/units mentioned in the above description does not necessarily correspond to the division of physical components; for example, one physical component may have multiple functions, or one function or step may be performed by several physical components in cooperation. Some or all of the physical components may be implemented as software executed by a processor, such as a central processing unit, a digital signal processor, or a microprocessor, or may be implemented as hardware, or may be implemented as an integrated circuit, such as an application specific integrated circuit. Such software may be distributed on a computer readable medium, which may include a computer storage medium (or non-transitory medium) and a communication medium (or transitory medium). The term of computer storage medium includes transitory and non-transitory, removable and non-removable media implemented in any method or technology for storing information (such as computer readable instructions, data structures, program blocks or other data), as is well known to one of ordinary skill in the art. Computer storage medium includes, but is not limited to, RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices, or any other medium which can be used for storing the desired information and which can accessed by a computer. In addition, a communication medium typically includes computer readable instructions, data structures, program blocks or other data in a modulated data signal such as a carrier wave or other transport mechanism, and includes any information delivery medium, as is well known to one of ordinary skill in the art.

It should be noted that in the present disclosure, the term "comprising" or "including" or any other variation thereof is intended to cover a non-exclusive inclusion, such that a process, method, article, or apparatus that includes a list of elements includes not only those elements but also other elements not expressly listed or inherent to the process, method, article, or apparatus. Without further limitation, an element defined by the phrase "comprising" or "including" does not exclude the presence of other identical elements in the process, method, article, or apparatus that includes the element.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and essence of the present disclosure, and such changes and modifications also fall within the scope of the present disclosure.

What is claimed is:

1. A method for controlling a display apparatus, which is applied to a control device, the method comprising:
   judging, by the control device, whether an input operation of an input device belongs to a preset operation in response to the input operation of the input device, and determining a current operating mode of the display apparatus; and
   controlling the display apparatus to execute corresponding functions according to the preset operation and the operating mode in response to the input operation belonging to the preset operation;
   wherein the preset operation comprises a combination of a plurality of key operations, and the operating mode is one of a plurality of optional modes comprising a safe mode,
   the method further comprises:
   judging whether the input device is a preset forbidden device or not in response to the input operation of the input device does not belong to the preset operation and the operating mode is the safe mode; and
   controlling the display apparatus to filter out the input operation in response to the input device being the preset forbidden device.

2. The method according to claim 1, wherein the preset operation is determined according to preconfigured key information, and the key information comprises: at least one of a function of a key, a number of times a key is pressed, and a sequence of a key.

3. The method according to claim 1, wherein the control device comprises a main controller; the preset operation comprises a mode switching operation; and the mode switching operation comprises: a combination of key operations sequentially performed on a plurality of first type keys according to a first sequence within a preset time period; and
   controlling the display apparatus to execute the corresponding functions in response to that the input operation is the mode switching operation and the operating mode is a non-safe mode, comprises:
   controlling, by the main controller, the display apparatus to open the safe mode, and generating and storing a safe mode identifier.

4. The method according to claim 3, wherein controlling the display apparatus to execute the corresponding functions in response to that the input operation is the mode switching operation and the operating mode is the safe mode, comprises:
   controlling the display apparatus to close the safe mode, and clearing the safe mode identifier stored in the control device.

5. The method according to claim 3, wherein controlling the display apparatus to execute the corresponding functions in response to that the input operation is the mode switching operation and the operating mode is the non-safe mode further comprises:
   outputting, by the control device, a configuration request to request a user to input configuration information; wherein the configuration information comprises: device information of a preset forbidden device and key information corresponding to the mode switching operation; and
   receiving and storing, by the control device, the configuration information input by the user.

6. The method according to claim 5, wherein the outputting, by the control device, the configuration request comprises:
   judging, by the control device, whether first valid flag information is stored in the control device; and
   in response to the first valid flag information being not stored in the control device, outputting the configuration request to request the user to input the configuration information; and outputting a flag request to request the user to input one of the first valid flag information and second valid flag information; wherein the first valid flag information indicating that the configuration information input by the user is valid continuously; and the second valid flag information indicating that the configuration information input by the user is valid in the current safe mode; and
   the method further comprises: receiving and storing, by the control device, the first valid flag information or the second valid flag information input by the user.

7. The method according to claim 1, wherein the determining the current operating mode of the display apparatus comprises:
   judging, by the control device, whether a safe mode identifier is stored in the control device; and determining that the current operating mode of the display apparatus is the safe mode in response to the safe mode identifier being stored in the control device.

8. The method according to claim 7, wherein the preset operation comprises: a safe turn-off operation, and the safe turn-off operation comprises: a combination of key operations sequentially performed on a second type key and a plurality of first type keys according to a second sequence within a preset time period during an operation process of the display apparatus;
   the control device comprises a main controller and an auxiliary controller; and
   wherein controlling the display apparatus to execute the corresponding functions in response to that the input operation is the safe turn-off operation and the operating mode is the safe mode, comprises:
   controlling, by the main controller, the display apparatus to be turned off and writing the safe mode identifier stored in the main controller into the auxiliary controller.

9. The method according to claim 8, wherein the second type key comprises a power key.

10. The method according to claim 8, wherein the auxiliary controller comprises a single chip microcomputer.

11. The method according to claim 8, wherein, judging, by the control device, whether or not the safe mode identifier is stored in the control device in response to that the display apparatus is in a turn-off state comprises: judging, by the auxiliary controller, whether the safe mode identifier is stored in the auxiliary controller;
    the preset operation further comprises a safe turn-on operation; the safe turn-on operation comprises: a combination of key operations sequentially performed on a second type key and a plurality of first type keys according to a second sequence within a preset time period when the display apparatus is in the turn-off state; and
    controlling the display apparatus to execute the corresponding functions in response to that the input operation is the safe turn-on operation and the operating mode is the safe mode, comprises:
    controlling the display apparatus to be turned on.

12. The method according to claim 11, wherein the second type key in the safe turn-on operation comprises a power key.

13. The method according to claim 11, wherein the auxiliary controller comprises a single chip microcomputer.

14. A display apparatus, comprising:
one or more processors; and
a memory for storing one or more programs therein;
wherein the one or more programs, when executed by the one or more processors, cause the one or more processors to implement the method according to claim 1.

15. A computer readable non-transitory medium on which a computer program is stored; wherein the computer program, when executed by a processor, implements the method according to claim 1.

16. A device for controlling a display apparatus, comprising:
a judging module configured to judge whether an input operation of an input device belongs to a preset operation in response to the input operation of the input device, and determine a current operating mode of the display apparatus; and
a processing module configured to control the display apparatus to execute corresponding functions according to the preset operation and the operating mode in response to the input operation belonging to the preset operation;
wherein the preset operation comprises a combination of a plurality of key operations, and the operating mode is one of a plurality of optional modes comprising the safe mode,
the judging module is further configured to:
judge whether the input device is a preset forbidden device or not in response to the input operation of the input device does not belong to the preset operation and the operating mode is the safe mode; and
control the display apparatus to filter out the input operation in response to the input device being the preset forbidden device.

* * * * *